US008568629B2

(12) United States Patent
Cardozo et al.

(10) Patent No.: US 8,568,629 B2
(45) Date of Patent: Oct. 29, 2013

(54) SPRAY-DRYING PROCESS

(75) Inventors: Larry Savio Cardozo, Newcastle upon Tyne (GB); Hossam Hassan Tantawy, Northumberland (GB); James Robert Lickiss, Northumberland (GB); Nigel Patrick Somerville Roberts, Newcastle upon Tyne (GB)

(73) Assignee: The Procter & Gamble Company, Cincinnati, OH (US)

( * ) Notice: Subject to any disclaimer, the term of this patent is extended or adjusted under 35 U.S.C. 154(b) by 52 days.

(21) Appl. No.: 12/968,511

(22) Filed: Dec. 15, 2010

(65) Prior Publication Data

US 2011/0147964 A1 Jun. 23, 2011

(30) Foreign Application Priority Data

Dec. 18, 2009 (EP) .................................... 09179952

(51) Int. Cl.
*B29B 9/00* (2006.01)

(52) U.S. Cl.
USPC ........................................................... 264/13

(58) Field of Classification Search
USPC ........................................................... 264/13
See application file for complete search history.

(56) References Cited

U.S. PATENT DOCUMENTS

| | | | | |
|---|---|---|---|---|
| 4,102,057 | A | 7/1978 | Key et al. | |
| 4,155,882 | A | 5/1979 | Davies et al. | |
| 4,261,850 | A | 4/1981 | Manders et al. | |
| 4,818,424 | A | 4/1989 | Evans et al. | |
| 4,820,441 | A | 4/1989 | Evans et al. | |
| 7,446,085 | B2 | 11/2008 | Imaizumi et al. | |
| 7,811,980 | B1 | 10/2010 | Tantawy et al. | |
| 7,842,657 | B2 | 11/2010 | Tantawy et al. | |
| 2003/0203832 | A1 | 10/2003 | Boucher et al. | |
| 2006/0069007 | A1 * | 3/2006 | Edward Boucher et al. | 510/446 |
| 2009/0325850 | A1 | 12/2009 | Tantawy et al. | |
| 2011/0146099 | A1 | 6/2011 | Cardozo et al. | |
| 2011/0147962 | A1 | 6/2011 | Cardozo et al. | |
| 2011/0147963 | A1 | 6/2011 | Cardozo et al. | |

FOREIGN PATENT DOCUMENTS

| | | | |
|---|---|---|---|
| DE | 25 19 655 | A1 | 11/1976 |
| EP | 1914297 | A1 | 4/2008 |
| EP | 2 138 565 | A1 | 12/2009 |
| EP | 2 138 566 | A1 | 12/2009 |
| GB | 2020687 | A | 11/1979 |
| GB | 1595293 | | 8/1981 |
| WO | WO96/03488 | A1 | 2/1996 |
| WO | WO 99/19453 | A1 | 4/1999 |
| WO | WO 2009/158221 | A1 | 12/2009 |
| WO | WO 2009/158449 | A1 | 12/2009 |

OTHER PUBLICATIONS

International Search Report and Written Opinion from the International Searching Authority, mailed on Mar. 16, 2011, International Application No. PCT/US2010/060470, 11 pages.
International Search Report mailed Mar. 16, 2011 for International Application Serial No. PCT/US2010/060468, 10 pages.
International Search Report mailed Mar. 16, 2011 for International Application Serial No. PCT/US2010/060419, 10 pages.
International Search Report mailed Mar. 9, 2011 for International Application Serial No. PCT/US2010/060060, 11 pages.
International Search Report mailed Mar. 17, 2011 for International Application Serial No. PCT/US2010/059432, 10 pages.
Non-Final Office Action mailed Nov. 25, 2011 for U.S. Appl. No. 12/966,319, 8 pages.
Non-Final Office Action mailed Oct. 5, 2011 for U.S. Appl. No. 12/966,410, 8 pages.
Non-Final Office Action mailed Nov. 21, 2011 for U.S. Appl. No. 12/968,413, 8 pages.
Non-Final Office Action mailed Sep. 28, 2011 for U.S. Appl. No. 12/968,567, 24 pages.
Final Office Action mailed Feb. 23, 2012 for U.S. Appl. No. 12/968,567, 7 pages.
U.S. Appl. No. 12/968,413, filed Dec. 15, 2010, Cardozo et al.

* cited by examiner

*Primary Examiner* — Larry Thrower

(74) *Attorney, Agent, or Firm* — Marianne Dressman; Tiffany M Zerby

(57) ABSTRACT

A process for preparing a spray-dried powder having:

(i) detersive surfactant; and (ii) other detergent ingredients; wherein the process has the steps of: (a) forming an aqueous detergent slurry in a mixer; (b) transferring the aqueous detergent slurry from the mixer in a pipe leading through at least one pump to a spray nozzle; (c) contacting a detergent ingredient to the aqueous detergent slurry in the pipe after the mixer and before the spray nozzle to form a mixture; (d) spraying the mixture through the spray nozzle into a spray-drying tower; and (e) spray-drying the mixture to form a spray-dried powder, wherein in step (c) the aqueous detergent slurry and the resultant mixture are in laminar flow, and wherein in step (c) the ratio of (i) the flow rate of the aqueous detergent slurry in $kgmin^{-1}$ to (ii) the flow rate of the detergent ingredient in $kgmin^{-1}$ is in the range of from 1 to 70.

11 Claims, No Drawings

SPRAY-DRYING PROCESS

FIELD OF THE INVENTION

The present invention relates to a spray-drying process.

BACKGROUND OF THE INVENTION

Spray-drying is the standard method for manufacturing laundry detergent base powder. Typically, detergent ingredients are mixed together to form an aqueous detergent slurry in a mixer, such as a crutcher mixer. This slurry is then transferred in and along a pipe through at least one pump to a spray nozzle, and the slurry is sprayed into a spray-drying tower, and spray-dried to form a spray-dried powder.

It is beneficial to have certain detergent ingredients in the same detergent particle. This avoids any problem of chemical variable and performance differences of each dose, due to product segregation which may occur when the laundry detergent product consists of numerous chemically distinct separate particles. However, certain detergent ingredients may be incompatible with other detergent ingredients, especially when they undergo a mixing step, especially an excessively prolonged mixing residence time, such as the mixing step that typically occurs in a crutcher mixer. These incompatible detergent ingredients can be introduced to the aqueous detergent slurry at a later stage in the spray-drying process, for example by injection into the pipe after the mixer but before the spray nozzle, or even after the pump and before the spray nozzle. This minimizes that amount of mixing and contact time between the incompatible detergent ingredients and the other detergent ingredients present in the aqueous detergent slurry.

However, even when these incompatible detergent ingredients are introduced at a later stage in the spray-drying process, there remains a need to further ensure that substantially no mixing occurs between these incompatible detergent ingredients and the other detergent ingredients already present in the aqueous detergent slurry until as late as possible in the spray-drying process, such as only at the spray nozzle.

The Inventors have overcome this problem by introducing these incompatible detergent ingredients to the aqueous detergent slurry at a later stage in the spray-drying process in such a manner so as to limit the extent of mixing that may occur. The Inventors carefully ensure that the detergent ingredient is contacted to an aqueous detergent slurry that is in laminar flow, and then carefully control the flow rates of both the aqueous detergent slurry and the detergent ingredient to ensure that the resultant mixture is also in laminar flow. In this manner, turbulence of the fluid in the pipe is avoided and the degree of axial mixing that may occur is substantially minimized.

SUMMARY OF THE INVENTION

The present invention provides a process as defined by the claims.

DETAILED DESCRIPTION OF THE INVENTION

Process for Preparing a Spray-Dried Powder

The process for preparing a spray-dried powder comprises the steps of: (a) forming an aqueous detergent slurry in a mixer; (b) transferring the aqueous detergent slurry from the mixer in a pipe leading through at least one pump to a spray nozzle; (c) contacting a detergent ingredient to the aqueous detergent slurry in the pipe after the mixer and before the spray nozzle to form a mixture; (d) spraying the mixture through the spray nozzle into a spray-drying tower; and (e) spray-drying the mixture to form a spray-dried powder, wherein in step (c) the aqueous detergent slurry and the resultant mixture are in laminar flow, and wherein in step (c) the ratio of (i) the flow rate of the aqueous detergent slurry in $kgmin^{-1}$ to (ii) the flow rate of the detergent ingredient in $kgmin^{-1}$ is in the range of from 1 to 70.

Step (a): the aqueous detergent slurry can be formed by mixing in any suitable vessel, such as mixer, in the standard manner. Suitable mixers include vertical mixers, slurry mixers, tank agitators, crutcher mixers and the like.

Step (b): the aqueous detergent slurry is transferred in a pipe from the mixer through at least one pump to a spray nozzle. The aqueous slurry is typically transferred though an intermediate storage vessel such as a drop tank, for example when the process is semi-continuous. Alternatively, the process can be a continuous process, in which case no intermediate storage vessel is required. The aqueous detergent slurry is transferred through at least one pump, preferably at least two, or even at least three or more pumps, although one or two, preferably two pumps may be preferred.

It is highly preferred to control the flow of the aqueous detergent slurry across the pipe immediately prior to step (c) such that the aqueous detergent slurry is in laminar flow in the pipe. This minimizes the turbulence at this stage of the process. Preferably, immediately prior to step (c) the average Reynolds number of the aqueous detergent slurry across the pipe is less than 1,000, preferably less than 900, or less than 800, or less than 700, or less than 600, or less than 500, or even less than 400. Reynolds number is described in more detail later in the description. As used herein: "immediately prior" typically means within 10 seconds, preferably with 8 seconds, or within 6 seconds, or within 4 second, or even within 2 seconds. Typically, immediately prior means within 0.5 metres, preferably within 0.4 metres, preferably within 0.2 metres, even more preferably within 0.1 metres upstream of the point in the pipe where the detergent ingredient is contacted to the aqueous detergent slurry.

Step (c): contacting a detergent ingredient to the aqueous detergent slurry in the pipe after the mixer and before the spray nozzle to form a mixture. Suitable detergent ingredients for use in step (c) are described in more detail later in the description. Preferably, the mixture formed in step (c) comprises from 20 wt % to 35 wt % water.

Preferably, in step (c) the aqueous detergent slurry and the resultant mixture are in laminar flow. Preferably, in step (c) the ratio of (i) the flow rate of the aqueous detergent slurry in $kgmin^{-1}$ to (ii) the flow rate of the detergent ingredient in $kgmin^{-1}$ is in the range of from 1 to 70, preferably from 7 to 35; this ensures that turbulence of the flow of detergent material in the pipe is minimized.

Step (c) can be carried out in any position after the mixer and before the spray nozzle. However, preferably step (c) is carried out after the aqueous detergent slurry has been transferred through at least one pump, although step (c) may be carried out before the aqueous detergent slurry has been transferred through at least one pump. In a preferred embodiment, the aqueous detergent slurry is transferred through at least two pumps, and step (c) is carried out after the aqueous detergent slurry has been transferred through the second pump and before the spray nozzle. It may even be preferred for step (c) to be carried out immediately before the spray nozzle.

Preferably, in step (c) the detergent ingredient is contacted to the aqueous detergent slurry in the pipe after the pump and before the spray nozzle to form a mixture. The mixture typically has a viscosity of from 0.8 Pas to 8 Pas, preferably from 1 Pas to 5 Pas. The viscosity is typically measured using a rheometer at a shear rate of 100 $s^{-1}$ and at a temperature of 70° C.

Step (d): the mixture formed in step (c) is sprayed through the spray nozzle into a spray-drying tower. Preferably, the mixture is at a temperature of from 60° C. to 130° C. when it is sprayed through the spray nozzle into a spray-drying tower. Suitable spray-drying towers are co-current or counter-current spray-drying towers. The mixture is typically sprayed at a pressure of from $6\times10^6$ Pa to $1\times10^7$ Pa.

Step (e): the mixture is spray-dried to form a spray-dried powder. Preferably, the exhaust air temperature is in the range of from 60° C. to 100° C.

Aqueous Detergent Slurry

The aqueous detergent slurry typically comprises detergent ingredients, such as alkalinity source, polymer, builder, detersive surfactant, filler salts and mixtures thereof. However, it may be especially preferred for the aqueous detergent slurry to comprise low levels, or even be free, of detersive surfactant. It may also be especially preferred for the aqueous detergent slurry to comprise low levels, or even be free, of builder. Preferably, the aqueous detergent slurry comprises from 0 wt % to 5 wt %, or to 4 wt %, or to 3 wt %, or to 2 wt %, or to 1 wt % detersive surfactant. It may even be preferred for the aqueous detergent slurry to be essentially free of detersive surfactant. By essentially free of it is typically meant herein to mean: “comprises no deliberately added”.

It may be highly advantageous for the aqueous detergent slurry to comprise low levels, or even be completely free, of detersive surfactants that are difficult to process when in slurry form and exposed to the residency time and process conditions typically experienced by an aqueous detergent slurry during a conventional spray-drying process. Such detersive surfactants include mid-chain branched detersive surfactants, especially mid-chain branched anionic detersive surfactants, and/or alkoxylated detersive surfactants, especially alkoxylated anionic detersive surfactants. Preferably, the aqueous detergent slurry formed in step (a) comprises from 0 wt % to 2 wt %, preferably to 1 wt % mid-chain branched detersive surfactant. Preferably, the aqueous detergent slurry formed in step (a) is essentially free from mid-chain branched detersive surfactant. By essentially free from, it is typically meant herein to mean: “comprises no deliberately added”. Preferably, the aqueous detergent slurry formed in step (a) comprises from 0 wt % to 2 wt %, preferably to 1 wt % alkoxylated detersive surfactant. Preferably, the aqueous detergent slurry formed in step (a) is essentially free from alkoxylated detersive surfactant. By essentially free from, it is typically meant herein to mean: “comprises no deliberately added”.

Preferably, the aqueous detergent slurry comprises from 0 wt % to 10 wt %, or to 9 wt %, or to 8 wt %, or to 7 wt %, or to 6 wt %, or to 5 wt %, or to 4 wt %, or to 3 wt %, or to 2 wt %, or to 1 wt % zeolite builder. Preferably, the aqueous detergent slurry is essentially free of zeolite builder.

Preferably, the aqueous detergent slurry comprises from 0 wt % to 10 wt %, or to 9 wt %, or to 8 wt %, or to 7 wt %, or to 6 wt %, or to 5 wt %, or to 4 wt %, or to 3 wt %, or to 2 wt %, or to 1 wt % phosphate builder. Preferably, the aqueous detergent slurry is essentially free of phosphate builder.

Preferably the aqueous detergent slurry is alkaline. Preferably, the aqueous detergent slurry has a pH of greater than 7.0, preferably greater than 7.7, or greater than 8.1, or even greater than 8.5, or greater than 9.0, or greater than 9.5, or greater than 10.0, or even greater than 10.5, and preferably to 14, or to 13, or to 12.

Preferably, the aqueous detergent slurry has a viscosity of from 0.1 Pas to 0.5 Pas. The viscosity is typically measured using a rheometer at a shear of 100 $s^{-1}$ and a temperature of 70° C.

Spray-Dried Powder

The spray-dried detergent powder typically comprises: (i) detersive surfactant; and (ii) other detergent ingredients. Highly preferably, the spray-dried detergent powder comprises: (a) from 0 wt % to 10 wt % zeolite builder; (b) from 0 wt % to 10 wt % phosphate builder; and (c) optionally from 0 wt % to 15 wt % silicate salt.

The spray-dried detergent powder is suitable for any detergent application, for example: laundry, including automatic washing machine laundering and hand laundering, and even bleach and laundry additives; hard surface cleaning; dish washing, especially automatic dish washing; carpet cleaning and freshening. However, highly preferably, the spray-dried detergent powder is a spray-dried laundry detergent powder.

The spray-dried detergent powder can be a fully formulated detergent product, such as a fully formulated laundry detergent product, or it can be combined with other particles to form a fully formulated detergent product, such as a fully formulated laundry detergent product. The spray-dried laundry detergent particles may be combined with other particles such as: enzyme particles; perfume particles including agglomerates or extrudates of perfume microcapsules, and perfume encapsulates such as starch encapsulated perfume accord particles; surfactant particles, such as non-ionic detersive surfactant particles including agglomerates or extrudates, anionic detersive surfactant particles including agglomerates and extrudates, and cationic detersive surfactant particles including agglomerates and extrudates; polymer particles including soil release polymer particles, cellulosic polymer particles; filler particles including sulphate salt particles, especially sodium sulphate particles; buffer particles including carbonate salt and/or silicate salt particles, preferably a particle comprising carbonate salt and silicate salt such as a sodium carbonate and sodium silicate co-particle, and particles and sodium bicarbonate; other spray-dried particles; fluorescent whitening particles; aesthetic particles such as coloured noodles or needles or lamellae particles; bleaching particles such as percarbonate particles, especially coated percarbonate particles, including carbonate and/or sulphate coated percarbonate, silicate coated percarbonate, borosilicate coated percarbonate, sodium perborate coated percarbonate; bleach catalyst particles, such as transition metal catalyst bleach particles, and imine bleach boosting particles; performed peracid particles; hueing dye particles; and any mixture thereof.

In a highly preferred embodiment of the present invention, the spray-dried detergent powder comprises: (a) from 15 wt % to 30 wt % detersive surfactant; (b) from 0 wt % to 4 wt % zeolite builder; (c) from 0 wt % to 4 wt % phosphate builder; and (d) optionally from 0 wt % to 15 wt % silicate salt.

The spray-dried powder typically comprises from 0 wt % to 7 wt %, preferably from 1 wt % to 5 wt %, and preferably from 2 wt % to 3 wt % water.

The spray-dried particle is typically flowable, typically having a cake strength of from 0 N to 20 N, preferably from 0 N to 15 N, more preferably from 0 N to 10 N, most preferably from 0 N to 5 N. The method to determine the cake strength is described in more detail elsewhere in the description.

Method for Measuring Cake Strength

A smooth plastic cylinder of internal diameter 6.35 cm and length 15.9 cm is supported on a suitable base plate. A 0.65 cm hole is drilled through the cylinder with the centre of the hole being 9.2 cm from the end opposite the base plate.

A metal pin is inserted through the hole and a smooth plastic sleeve of internal diameter 6.35 cm and length 15.25 cm is placed around the inner cylinder such that the sleeve can move freely up and down the cylinder and comes to rest on the metal pin. The space inside the sleeve is then filled (without tapping or excessive vibration) with the spray-dried powder such that the spray-dried powder is level with the top of the sleeve. A lid is placed on top of the sleeve and a 5 kg weight placed on the lid. The pin is then pulled out and the spray-dried powder is allowed to compact for 2 minutes. After 2 minutes the weight is removed, the sleeve is lowered to expose the powder cake with the lid remaining on top of the powder.

A metal probe is then lowered at 54 cm/min such that it contacts the centre of the lid and breaks the cake. The maximum force required to break the cake is recorded and is the result of the test. A cake strength of 0 N refers to the situation where no cake is formed.

Detergent Ingredient Suitable for Contacting to the Aqueous Detergent Slurry in Step (c)

Any detergent ingredient can be used for contacting the aqueous detergent slurry in step (c). However, highly preferred detergent ingredients are selected from: alkyl benzene sulphonic acid or salt thereof; polymer; alkoxylated detersive surfactant; sodium hydroxide; mid-chain branched detersive surfactant; cationic detersive surfactant; and mixtures thereof.

Preferably, in step (c) the detergent ingredient comprises alkyl benzene sulphonic acid or salt thereof. Preferably, in step (c) the detergent ingredient comprises polymer. Preferably, in step (c) the detergent ingredient comprises alkoxylated detersive surfactant. Preferably, in step (c) the detergent ingredient comprises sodium hydroxide. Preferably, in step (c) the detergent ingredient comprises mid-chain branched detersive surfactant. Preferably, in step (c) the detergent ingredient comprises cationic detersive surfactant.

Detersive Surfactant

Suitable detersive surfactants include anionic detersive surfactants, non-ionic detersive surfactant, cationic detersive surfactants, zwitterionic detersive surfactants and amphoteric detersive surfactants.

Preferred anionic detersive surfactants include sulphate and sulphonate detersive surfactants.

Preferred sulphonate detersive surfactants include alkyl benzene sulphonate, preferably $C_{10-13}$ alkyl benzene sulphonate. Suitable alkyl benzene sulphonate (LAS) is obtainable, preferably obtained, by sulphonating commercially available linear alkyl benzene (LAB); suitable LAB includes low 2-phenyl LAB, such as those supplied by Sasol under the tradename Isochem® or those supplied by Petresa under the tradename Petrelab®, other suitable LAB include high 2-phenyl LAB, such as those supplied by Sasol under the tradename Hyblene®. A suitable anionic detersive surfactant is alkyl benzene sulphonate that is obtained by DETAL catalyzed process, although other synthesis routes, such as HF, may also be suitable.

Preferred sulphate detersive surfactants include alkyl sulphate, preferably $C_{8-18}$ alkyl sulphate, or predominantly $C_{12}$ alkyl sulphate.

Another preferred sulphate detersive surfactant is alkyl alkoxylated sulphate, preferably alkyl ethoxylated sulphate, preferably a $C_{8-18}$ alkyl alkoxylated sulphate, preferably a $C_{8-18}$ alkyl ethoxylated sulphate, preferably the alkyl alkoxylated sulphate has an average degree of alkoxylation of from 0.5 to 20, preferably from 0.5 to 10, preferably the alkyl alkoxylated sulphate is a $C_{8-18}$ alkyl ethoxylated sulphate having an average degree of ethoxylation of from 0.5 to 10, preferably from 0.5 to 7, more preferably from 0.5 to 5 and most preferably from 0.5 to 3.

The alkyl sulphate, alkyl alkoxylated sulphate and alkyl benzene sulphonates may be linear or branched, substituted or un-substituted.

Suitable non-ionic detersive surfactants are selected from the group consisting of: $C_8$-$C_{18}$ alkyl ethoxylates, such as, NEODOL® non-ionic surfactants from Shell; $C_6$-$C_{12}$ alkyl phenol alkoxylates wherein preferably the alkoxylate units are ethyleneoxy units, propyleneoxy units or a mixture thereof; $C_{12}$-$C_{18}$ alcohol and $C_6$-$C_{12}$ alkyl phenol condensates with ethylene oxide/propylene oxide block polymers such as Pluronic® from BASF; $C_{14}$-$C_{22}$ mid-chain branched alcohols; $C_{14}$-$C_{22}$ mid-chain branched alkyl alkoxylates, preferably having an average degree of alkoxylation of from 1 to 30; alkylpolysaccharides, preferably alkylpolyglycosides; polyhydroxy fatty acid amides; ether capped poly(oxyalkylated) alcohol surfactants; and mixtures thereof.

Preferred non-ionic detersive surfactants are alkyl polyglucoside and/or an alkyl alkoxylated alcohol.

Preferred non-ionic detersive surfactants include alkyl alkoxylated alcohols, preferably $C_{8-18}$ alkyl alkoxylated alcohol, preferably a $C_{8-18}$ alkyl ethoxylated alcohol, preferably the alkyl alkoxylated alcohol has an average degree of alkoxylation of from 1 to 50, preferably from 1 to 30, or from 1 to 20, or from 1 to 10, preferably the alkyl alkoxylated alcohol is a $C_{8-18}$ alkyl ethoxylated alcohol having an average degree of ethoxylation of from 1 to 10, preferably from 1 to 7, more preferably from 1 to 5 and most preferably from 3 to 7. The alkyl alkoxylated alcohol can be linear or branched, and substituted or un-substituted.

Suitable cationic detersive surfactants include alkyl pyridinium compounds, alkyl quaternary ammonium compounds, alkyl quaternary phosphonium compounds, alkyl ternary sulphonium compounds, and mixtures thereof.

Preferred cationic detersive surfactants are quaternary ammonium compounds having the general formula:

$$(R)(R_1)(R_2)(R_3)N^+X^-$$

wherein, R is a linear or branched, substituted or unsubstituted $C_{6-18}$ alkyl or alkenyl moiety, $R_1$ and $R_2$ are independently selected from methyl or ethyl moieties, $R_3$ is a hydroxyl, hydroxymethyl or a hydroxyethyl moiety, X is an anion which provides charge neutrality, preferred anions include: halides, preferably chloride; sulphate; and sulphonate. Preferred cationic detersive surfactants are mono-$C_{6-18}$ alkyl mono-hydroxyethyl di-methyl quaternary ammonium chlorides. Highly preferred cationic detersive surfactants are mono-$C_{8-10}$ alkyl mono-hydroxyethyl di-methyl quaternary ammonium chloride, mono-$C_{10-12}$ alkyl mono-hydroxyethyl di-methyl quaternary ammonium chloride and mono-$C_{10}$ alkyl mono-hydroxyethyl di-methyl quaternary ammonium chloride.

A suitable detersive surfactant is a mid-chain branched detersive surfactant. Suitable mid-chain branched detersive surfactants are described in more detail elsewhere in the description.

Mid-Chain Branched Detersive Surfactant

Suitable mid-chain branched surfactants can be anionic, non-ionic, cationic, zwiterionic or amphoteric. Preferably, the mid-chain branched detersive surfactant is a mid-chain branched anionic detersive surfactant.

A suitable mid-chain branched detersive surfactant comprises alkylarylsulphonate having the general formula:

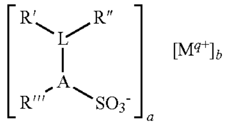

wherein:

L is an acyclic aliphatic hydrocarbyl of from 6 to 18 carbon atoms in total;

M is a cation or cation mixture and q is the valence thereof;

a and b are numbers selected such that said alkylarylsulphonate is electro-neutral;

R' is selected from H and $C_1$ to $C_3$ alkyl;

R" is selected from H and $C_1$ to $C_3$ alkyl;

R'" is selected from H and $C_1$ to $C_3$ alkyl;

both of R' and R" are non-terminally attached to L and at least one of R' and R" is $C_1$ to $C_3$ alkyl, preferably methyl and/or ethyl, preferably methyl; and A is aryl, preferably benzene.

Another suitable mid-chain branched detersive surfactant comprises mid-chain branched alkyl sulphate having the general formula:

$$[CH_3CH_2(CH_2)_wCH(R)(CH_2)_xCH(R^1)(CH_2)_yCH(R^2)(CH_2)_z(EO/PO)_mSO_3^-]_a[M^{q+}]_b$$

wherein the total number of carbon atoms in the branched alkyl moiety of this formula, including the R, $R^1$, and $R^2$ branching, but not including the carbon atoms in the EO/PO alkoxy moiety if present, is from 14 to 20;

wherein R, $R^1$, and $R^2$ are each independently selected from hydrogen and $C_1$-$C_3$ alkyl, provided R, $R^1$, and $R^2$ are not all hydrogen;

wherein w is an integer from 0 to 13, wherein x is an integer from 0 to 13;

wherein y is an integer from 0 to 13;

wherein z is an integer of at least 1;

wherein w+x+y+z is from 8 to 14, wherein EO/PO are alkoxy moieties, preferably selected from ethoxy, propoxy, and mixed ethoxy/propoxy groups, preferably ethoxy;

wherein m is from 0 to 30, preferably from 0 to 10, or from 0.5 to 7, or from 0.5 to 5, or from 0.5 to 3, or even from 1 to 3;

M is a cation or cation mixture and q is the valence thereof;

a and b are numbers selected such that said alkyl sulphate is electro-neutral; and preferably when z is 1, at least R or $R^1$ is not hydrogen.

Alkoxylated Detersive Surfactant

Suitable alkoxylated detersive surfactants can be anionic or non-ionic or a mixture thereof. A preferred alkoxylated anionic detersive surfactant is alkyl alkoxylated sulphate, preferably alkyl ethoxylated sulphate, preferably a $C_{8-18}$ alkyl alkoxylated sulphate, preferably a $C_{8-18}$ alkyl ethoxylated sulphate, preferably the alkyl alkoxylated sulphate has an average degree of alkoxylation of from 0.5 to 20, preferably from 0.5 to 10, preferably the alkyl alkoxylated sulphate is a $C_{8-18}$ alkyl ethoxylated sulphate having an average degree of ethoxylation of from 0.5 to 10, preferably from 0.5 to 7, more preferably from 0.5 to 5 and most preferably from 0.5 to 3.

A preferred alkoxylated non-ionic detersive surfactant is alkyl alkoxylated alcohol, preferably $C_{8-18}$ alkyl alkoxylated alcohol, preferably a $C_{8-18}$ alkyl ethoxylated alcohol, preferably the alkyl alkoxylated alcohol has an average degree of alkoxylation of from 1 to 50, preferably from 1 to 30, or from 1 to 20, or from 1 to 10, preferably the alkyl alkoxylated alcohol is a $C_{8-18}$ alkyl ethoxylated alcohol having an average degree of ethoxylation of from 1 to 10, preferably from 1 to 7, more preferably from 1 to 5 and most preferably from 3 to 7. The alkyl alkoxylated alcohol can be linear or branched, and substituted or un-substituted.

Polymer

The polymer can be any suitable polymer.

One suitable polymer is an amphiphilic graft polymer (AGP). Suitable AGPs are obtainable by grafting a polyalkylene oxide of number average molecular weight from about 2,000 to about 100,000 with vinyl acetate, which may be partially saponified, in a weight ratio of polyalkylene oxide to vinyl acetate of about 1:0.2 to about 1:10. The vinyl acetate may, for example, be saponified to an extent of up to 15%. The polyalkylene oxide may contain units of ethylene oxide, propylene oxide and/or butylene oxide. Selected embodiments comprise ethylene oxide.

In some embodiments the polyalkylene oxide has a number average molecular weight of from about 4,000 to about 50,000, and the weight ratio of polyalkylene oxide to vinyl acetate is from about 1:0.5 to about 1:6. A material within this definition, based on polyethylene oxide of molecular weight 6,000 (equivalent to 136 ethylene oxide units), containing approximately 3 parts by weight of vinyl acetate units per 1 part by weight of polyethylene oxide, and having itself a molecular weight of about 24,000, is commercially available from BASF as Sokalan HP22.

Suitable AGPs may be present in the detergent composition at weight percentages of from about 0 to about 5%, preferably from about above 0% to about 4%, or from about 0.5% to about 2%. In some embodiments, the AGP is present at greater than about 1.5 wt %. The AGPs are found to provide excellent hydrophobic soil suspension even in the presence of cationic coacervating polymers.

Preferred AGPs are based on water-soluble polyalkylene oxides as a graft base and side chains formed by polymerization of a vinyl ester component. These polymers having an average of less than or equal to one graft site per 50 alkylene oxide units and mean molar masses (Mw) of from about 3000 to about 100,000.

Another suitable polymer is polyethylene oxide, preferably substituted or unsubstituted.

Another suitable polymer is cellulosic polymer, preferably selected from alkyl cellulose, alkyl alkoxyalkyl cellulose, carboxylalkyl cellulose, alkyl carboxyalkyl, more preferably selected from carboxymethyl cellulose (CMC) including blocky CMC, methyl cellulose, methyl hydroxyethyl cellulose, methyl carboxymethyl cellulose, and mixtures thereof.

Other suitable polymers are soil release polymers. Suitable polymers include polyester soil release polymers. Other suitable polymers include terephthalate polymers, polyurethanes, and mixtures thereof. The soil release polymers, such as terephthalate and polyurethane polymers can be hydrophobically modified, for example to give additional benefits such as sudsing.

Other suitable polymers include polyamines, preferably polyethylene imine polymers, preferably having ethylene oxide and/or propylene oxide functionalized blocks Other suitable polymers include synthetic amino containing amphoteric/and/or zwitterionic polymers, such as those derived from hexamethylene diamine.

Another suitable polymer is a polymer that can be co-micellized by surfactants, such as the AGP described in more detail above.

Other suitable polymers include carboxylate polymers, such as polyacrylates, and acrylate/maleic co-polymers and other functionalized polymers such as styrene acrylates.

Other suitable polymers include silicone, including amino-functionalised silicone.

Other suitable polymers include polysaccharide polymers such as celluloses, starches, lignins, hemicellulose, and mixtures thereof.

Other suitable polymers include cationic polymers, such as deposition aid polymers, such as cationically modified cellulose such as cationic hydroxy ethylene cellulose, cationic guar gum, cationic starch, cationic acrylamides and mixtures thereof.

Mixtures of any of the above described polymers can be used herein.

Zeolite Builder

Suitable zeolite builder includes include zeolite A, zeolite P and zeolite MAP. Especially suitable is zeolite 4A.

Phosphate Builder

A typical phosphate builder is sodium tri-polyphosphate.

Silicate Salt

A suitable silicate salt is sodium silicate, preferably 1.6R and/or 2.0R sodium silicate.

Other Detergent Ingredients

The composition typically comprises other detergent ingredients. Suitable detergent ingredients include: transition metal catalysts; imine bleach boosters; enzymes such as amylases, carbohydrases, cellulases, laccases, lipases, bleaching enzymes such as oxidases and peroxidases, proteases, pectate lyases and mannanases; source of peroxygen such as percarbonate salts and/or perborate salts, preferred is sodium percarbonate, the source of peroxygen is preferably at least partially coated, preferably completely coated, by a coating ingredient such as a carbonate salt, a sulphate salt, a silicate salt, borosilicate, or mixtures, including mixed salts, thereof; bleach activator such as tetraacetyl ethylene diamine, oxybenzene sulphonate bleach activators such as nonanoyl oxybenzene sulphonate, caprolactam bleach activators, imide bleach activators such as N-nonanoyl-N-methyl acetamide, preformed peracids such as N,N-pthaloylamino peroxycaproic acid, nonylamido peroxyadipic acid or dibenzoyl peroxide; suds suppressing systems such as silicone based suds suppressors; brighteners; hueing agents; photobleach; fabric-softening agents such as clay, silicone and/or quaternary ammonium compounds; flocculants such as polyethylene oxide; dye transfer inhibitors such as polyvinylpyrrolidone, poly 4-vinylpyridine N-oxide and/or co-polymer of vinylpyrrolidone and vinylimidazole; fabric integrity components such as oligomers produced by the condensation of imidazole and epichlorhydrin; soil dispersants and soil anti-redeposition aids such as alkoxylated polyamines and ethoxylated ethyleneimine polymers; anti-redeposition components such as polyesters and/or terephthalate polymers, polyethylene glycol including polyethylene glycol substituted with vinyl alcohol and/or vinyl acetate pendant groups; perfumes such as perfume microcapsules, polymer assisted perfume delivery systems including Schiff base perfume/polymer complexes, starch encapsulated perfume accords; soap rings; aesthetic particles including coloured noodles and/or needles; dyes; fillers such as sodium sulphate, although it may be preferred for the composition to be substantially free of fillers; carbonate salt including sodium carbonate and/or sodium bicarbonate; silicate salt such as sodium silicate, including 1.6R and 2.0R sodium silicate, or sodium metasilicate; co-polyesters of di-carboxylic acids and diols; cellulosic polymers such as methyl cellulose, carboxymethyl cellulose, hydroxyethoxycellulose, or other alkyl or alkylalkoxy cellulose, and hydrophobically modified cellulose; carboxylic acid and/or salts thereof, including citric acid and/or sodium citrate; and any combination thereof.

Reynolds Number

Reynolds number (Re) is a dimensionless number that quantifies the ratio of inertial forces to viscous forces for a given flow condition. For flow in a pipe and as used herein, Reynolds number (Re) is determined by the following formula:

$$Re=\rho VD/\mu$$

wherein

Re=Reynolds number $\rho$=density of the fluid in $kgm^{-3}$

V=mean fluid velocity in $ms^{-1}$ (=volumetric flow rate in $m^3 s^{-1}$/pipe cross sectional area in $m^2$)

D=hydraulic diameter of the pipe in m $\mu$=dynamic viscosity of the fluid in $kgm^{-1} s^{-1}$ Density of the Fluid in $Kgm^{-3}$ ($\rho$)

$\rho$ is typically determined by filling a defined volume container with representative fluid (e.g. aqueous detergent slurry), then dividing the weight with known volume of container. Typically $\rho$ is in the range of from 1200 $kg/m^3$ to 1500 $kg/m^3$.

Mean Fluid Velocity in $ms^{-1}$ (V)

V is the volumetric flow rate of the fluid in $m^3 s^{-1}$ divided by the pipe cross sectional area of the pipe in $m^2$.

Hydraulic Diameter of the Pipe in m (D)

D=4 times the cross sectional area of the pipe divided by the wetted perimeter. The wet perimeter for the pipe is the total wet perimeter that is in contact with fluid. For a circular pipe, the wet perimeter is the internal circumference of the pipe. For a circular pipe, D is the internal diameter of the pipe. Typically D is from 0.1 m to 0.3 m.

Dynamic Viscosity of the Fluid in $kgm^{-1} s^{-1}$ ($\mu$)

The dynamic viscosity is typically measured using a standard rheometer capable of generating a shear rate of 100 $s^{-1}$ (for example Paar Physica UDS200). For the purpose of the present invention, the dynamic viscosity is determined at a shear rate of 100 $s^{-1}$ and at a temperature of 70° C. Typical $\mu$ is in the range of from 1 $kgm^{-1} s^{-1}$ to 10 $kgm^{-1} s^{-1}$.

One can control the Reynolds number by controlling the density of the fluid, the mean fluid velocity (the volumetric flow rate and/or the pipe cross sectional area) the hydraulic diameter of the pipe, and/or the dynamic viscosity of the fluid of the aqueous detergent slurry, the detergent ingredient and/or the mixture. Reducing the volumetric flow rate lowers the Reynolds number and reduces turbulence. Increasing the dynamic viscosity of the fluid lowers the lowers the Reynolds number and reduces turbulence. Increasing the cross-sectional area of the pipe lowers the Reynolds number and reduces turbulence.

It is highly preferred for the step (c) to be carried out in such a manner so as to avoid turbulent flow. In this manner, the degree of axial mixing of detergent ingredients is minimized; thus allowing incompatible chemistries to be simultaneously spray-dried in a manner than minimizes their contact and interaction.

EXAMPLES

Example 1

A Spray-Dried Laundry Detergent Powder and Process of Making it

Aqueous Alkaline Slurry Composition.

| Component | Aqueous slurry (parts) |
|---|---|
| Sodium Silicate | 8.5 |
| Acrylate/maleate copolymer | 3.2 |
| Hydroxyethane di(methylene phosphonic acid) | 0.6 |
| Sodium carbonate | 8.8 |
| Sodium sulphate | 42.9 |
| Water | 19.7 |
| Miscellaneous, such as magnesium sulphate, and one or more stabilizers | 1.7 |
| Aqueous alkaline slurry parts | 85.4 |

Preparation of a Spray-Dried Laundry Detergent Powder.

An alkaline aqueous slurry having the composition as described above is prepared in a slurry making vessel (crutcher). The alkaline aqueous slurry is shear thinning and has a viscosity in the range of from 0.5 to 30 Pas at a temperature of 70° C. and at a shear rate of 50 $s^{-1}$. The moisture content of the above slurry is 23.1%. Any ingredient added above in liquid form is heated to 70° C., such that the aqueous slurry is never at a temperature below 70° C. Saturated steam at a pressure of $6.0\times10^5$ Pa is injected into the crutcher to raise the temperature to 90° C. The slurry is then pumped into a low pressure line (having a pressure of $5.0\times10^5$ Pa) at a flow rate of 23.34 kg/min.

0.1 metres upstream of the point in the pipe where the detergent ingredient is contacted to the aqueous detergent slurry, the following conditions apply:

density (ρ) of the aqueous detergent slurry=1300 $kgm^{-3}$ mean fluid velocity (V) of the aqueous detergent slurry=0.38 $ms^{-1}$ (volumetric flow rate of 0.0003 $m^3$ $s^{-1}$/pipe cross sectional area of 0.000785 $m^2$)

hydraulic diameter of the pipe (D) in m=0.1 m dynamic viscosity (μ) of the aqueous detergent slurry=1 $kgm^{-1}$ $s^{-1}$ Reynolds number (Re)=Re=ρVD/μ=(1300×0.38×0.1)/1=49.4

Separately, 11.4 parts of $C_8$-$C_{24}$ alkyl benzene sulphonic acid (HLAS), and 3.2 parts of a 50 w/w % aqueous sodium hydroxide solution are pumped into the low pressure line at a flow rate of 3.99 kg/min. The viscosity of the alkaline slurry increases. The resultant mixture is then pumped by a high pressure pump into a high pressure line (having an exit pressure of $8.0\times10^6$ Pa). The mixture is then sprayed at a rate of 27.33 kg/min at a pressure of $8.0\times10^6$ Pa and at a temperature of 90° C.+/−2° C. through a spray pressure nozzle into a counter current spray-drying tower with an air inlet temperature of 300° C. The mixture is atomised and the atomised slurry is dried to produce a solid mixture, which is then cooled and sieved to remove oversize material (>1.8 mm) to form a spray-dried powder, which is free-flowing. Fine material (<0.15 mm) is elutriated with the exhaust the exhaust air in the spray-drying tower and collected in a post tower containment system. The spray-dried powder has a moisture content of 2.5 wt %, a bulk density of 510 g/l and a particle size distribution such that greater than 80 wt % of the spray-dried powder has a particle size of from 150 to 710 micrometers. The composition of the spray-dried powder is given below.

Spray-Dried Laundry Detergent Powder Composition

| Component | % w/w Spray Dried Powder |
|---|---|
| Sodium silicate salt | 10.0 |
| $C_8$-$C_{24}$ alkyl benzene sulphonate | 15.1 |
| Acrylate/maleate copolymer | 4.0 |
| Hydroxyethane di(methylene phosphonic acid) | 0.7 |
| Sodium carbonate | 11.9 |
| Sodium sulphate | 53.7 |
| Water | 2.5 |
| Miscellaneous, such as magnesium sulphate, and one or more stabilizers | 2.1 |
| Total Parts | 100.00 |

A Granular Laundry Detergent Composition.

| Component | % w/w granular laundry detergent composition |
|---|---|
| Spray-dried powder of example 1 (described above) | 59.38 |
| 91.6 wt % active linear alkyl benzene sulphonate flake supplied by Stepan under the tradename Nacconol 90G ® | 0.22 |
| Citric acid | 5.00 |
| Sodium percarbonate (having from 12% to 15% active AvOx) | 14.70 |
| Photobleach particle | 0.01 |
| Lipase (11.00 mg active/g) | 0.70 |
| Amylase (21.55 mg active/g) | 0.33 |
| Protease (56.00 mg active/g) | 0.43 |
| Tetraacetyl ethylene diamine agglomerate (92 wt % active) | 4.35 |
| Suds suppressor agglomerate (11.5 wt % active) | 0.87 |
| Acrylate/maleate copolymer particle (95.7 wt % active) | 0.29 |
| Green/Blue carbonate speckle | 0.50 |
| Sodium Sulphate | 9.59 |
| Solid perfume particle | 0.63 |
| Ethoxylated $C_{12}$-$C_{18}$ alcohol having an average degree of ethoxylation of 7 (AE7) | 3.00 |
| Total Parts | 100.00 |

The above laundry detergent composition was prepared by dry-mixing all of the above particles (all except the AE7) in a standard batch mixer. The AE7 in liquid form is sprayed on the particles in the standard batch mixer. Alternatively, the AE7 in liquid form is sprayed onto the spray-dried powder of example 1. The resultant powder is then mixed with all of the other particles in a standard batch mixer.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process for preparing a spray-dried powder comprising:

(i) detersive surfactant; and (ii) other detergent ingredients;

wherein the process comprises the steps of:

(a) forming an aqueous detergent slurry in a mixer;

(b) transferring the aqueous detergent slurry from the mixer in a pipe leading through at least one pump to a spray nozzle;

(c) injecting a detergent ingredient into the pipe so that the detergent ingredient first makes contact with the aqueous detergent slurry in the pipe after the mixer and before the spray nozzle to form a mixture;

(d) spraying the mixture through the spray nozzle into a spray-drying tower; and (e) spray-drying the mixture to form a spray-dried powder, wherein in step (c) the aqueous detergent slurry and the resultant mixture are in laminar flow, and wherein in step (c) the ratio of (i) the flow rate of the aqueous detergent slurry in $kgmin^{-1}$ to (ii) the flow rate of the injected detergent ingredient in $kgmin^{-1}$ is in the range of from about 1 to about 70.

2. A process according to claim 1, wherein in step (c) the ratio of (i) the flow rate of the aqueous detergent slurry in $kgmin^{-1}$ to (ii) the flow rate of the detergent ingredient in $kgmin^{-1}$ is in the range of from about 7 to 35.

3. A process according to claim 1, wherein immediately prior to step (c) the average Reynolds number of the aqueous detergent slurry across the pipe is less than about 500.

4. A process according to claim 1, wherein in step (c) the detergent ingredient is contacted to the aqueous detergent slurry in the pipe after the pump and before the spray nozzle to form a mixture.

5. A process according to claim 1, wherein in step (c) the detergent ingredient comprises alkyl benzene sulphonic acid or salt thereof.

6. A process according to claim 1, wherein in step (c) the detergent ingredient comprises polymer.

7. A process according to claim 1, wherein in step (c) the detergent ingredient comprises alkoxylated detersive surfactant.

8. A process according to claim 1, wherein in step (c) the detergent ingredient comprises sodium hydroxide.

9. A process according to claim 1, wherein in step (c) the detergent ingredient comprises branched detersive surfactant.

10. A process according to claim 1, wherein in step (c) the detergent ingredient comprises cationic detersive surfactant.

11. A process according to claim 1, wherein the slurry comprises from about 0 wt % to about 5 wt % detersive surfactant.

* * * * *